(12) United States Patent
Penetrante (10) Patent No.: US 6,345,497 B1
(45) Date of Patent: Feb. 12, 2002

(54) NOX REDUCTION BY ELECTRON BEAM-PRODUCED NITROGEN ATOM INJECTION

(75) Inventor: Bernardino M. Penetrante, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/518,003

(22) Filed: Mar. 2, 2000

(51) Int. Cl.[7] ............................................... F01N 3/00
(52) U.S. Cl. .............................. 60/275; 60/274; 60/303; 422/186.03; 422/186.04; 204/164
(58) Field of Search ..................... 60/274, 275, 303, 60/301; 422/186.03, 186.04, 186.21; 204/164, 168, 169, 170

(56) References Cited

U.S. PATENT DOCUMENTS

| | | | | |
|---|---|---|---|---|
| 4,076,606 A | * | 2/1978 | Suzuki et al. ............ 204/157.1 |
| 5,547,651 A | | 8/1996 | Rolfe | |
| 5,655,210 A | * | 8/1997 | Gregoire et al. ............ 422/186 |
| 5,695,616 A | | 12/1997 | Helfritch et al. | |
| 5,695,619 A | * | 12/1997 | Williamson et al. ........ 204/165 |
| 5,702,572 A | | 12/1997 | Fujimura et al. | |
| 5,711,147 A | * | 1/1998 | Vogtlin et al. ................. 60/274 |
| 5,746,984 A | * | 5/1998 | Hoard ........................ 422/169 |
| 5,782,085 A | | 7/1998 | Steinwandel et al. | |
| 5,807,526 A | * | 9/1998 | Miljevic ..................... 422/174 |
| 5,855,855 A | * | 1/1999 | Williamson et al. ... 422/186.04 |
| 5,893,267 A | | 4/1999 | Vogtlin et al. | |
| 6,002,202 A | | 12/1999 | Meyer et al. | |
| 6,030,506 A | * | 2/2000 | Bittenson et al. ............ 204/164 |
| 6,038,854 A | * | 3/2000 | Penetrante et al. ............ 60/297 |
| 6,118,040 A | * | 9/2000 | Coral et al. .................. 588/204 |

FOREIGN PATENT DOCUMENTS

WO    WO98/11982    3/1998

OTHER PUBLICATIONS

"NOx Reduction by Compact Electron Beam Processing", B.M. Penetrante et al., Proceedings of the 1995 Diesel Engine Emissions Reduction Workshop, Jul. 24–27, 1995, La Jolla, CA.

"More Efficient, Less Expensive Electron Beam Processing", Science & Technology Review, Nov./Dec. 1995, pp. 32–33.

"The Destruction of Nitric Oxide by Nitrogen Atoms from Plasma Jets", Houshang F. Behbahani et al., Combustion Science and Technology, 1982, vol. 27, pp. 123–132.

* cited by examiner

Primary Examiner—Thomas Denion
Assistant Examiner—Binh Tran
(74) Attorney, Agent, or Firm—Allan H. Thompson (57) ABSTRACT

Deactivated atomic nitrogen generated by an electron beam from a gas stream containing more than 99% $N_2$ is injected at low temperatures into an engine exhaust to reduce NOx emissions. High NOx reduction efficiency is achieved with compact electron beam devices without use of a catalyst.

16 Claims, 5 Drawing Sheets

NOX REDUCTION BY ELECTRON BEAM-PRODUCED NITROGEN ATOM INJECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

Extensive research is being done worldwide to develop new, commercially viable methods for removing undesirable chemical species from air or from exhaust gases, such as combustion exhausts, contaminated liquids, such as industrial process effluents, or biologically contaminated water, and contaminated surfaces. One of the most prevalent undesirable components in a gas phase (e.g., polluted air) is nitrogen oxides (NOx). A major NOx component is nitric oxide (NO) which is the primary pollutant in all fuel combustion exhaust gases. Nitric Oxide gas oxidizes in the atmosphere to form nitrogen dioxide ($NO_2$). Nitrogen dioxide is the primary reactant in atmospheric, photochemical reactions which produce unhealthful air pollutants, such as ozone. Nitrogen dioxide is also known as an acid gas which, together with sulfur dioxide, causes acid rain.

Major sources of NO emissions are internal combustion engines and utility boilers. Nitric oxide is formed at high temperatures during fuel combustion by the reaction of nitrogen and oxygen gas components of combustion air (i.e., thermal NOx), and the oxidation of fuel bound nitrogen compounds (i.e., fuel NOx).

Among the approaches to addressing NOx reduction are technologies employing electrical excitation in the gas phase, such as electrical discharge and electron beam techniques. In some of these techniques, NO gas has been shown to be reduced in a gas stream whereby "deactivated" nitrogen atoms generated from, for instance, a plasma jet are injected into the gas stream. However, such plasmas operate to dissociate molecular nitrogen to deactivated nitrogen atoms at relatively high temperatures, e.g., 900 C. Furthermore, in U.S. Pat. Nos. 5,547,651 and 5,782,085, microwave irradiation causing dissociation of molecular nitrogen into nitrogen atoms has been employed in 97–99% pure nitrogen streams for NOx reduction.

The use of electron beam irradiation for flue gas treatment ($NOx/SO_2$ removal) has been conducted as early as 1970. When the electron beam process is used to clean the flue gas from an electric utility boiler, the flue gas is first cleaned of flyash by a particle collector. The gas then passes through an evaporative spray cooler where the gas temperature is lowered, as the humidity is increased. The gas then passes to a process vessel where it is irradiated by a beam of high-energy electrons, in the presence of a near-stoichiometric amount of ammonia that is injected upstream of the process vessel. $SO_2$ and $NO_x$ are oxidized to form $H_2SO_4$ and $HNO_3$, respectively. These acids subsequently react with the added ammonia to form ammonium sulfate and ammonium sulfatenitrate. Such salts are recovered as a dry powder using a conventional particle collector and the collected powder is useful as an agricultural fertilizer.

Most studies of electron beam flue gas treatment have used ammonia as the reagent, with ammonium sulfate and ammonium nitrate as the major products. The use of alternative reagents has also been studied. The sulfuric and nitric acids can be neutralized by an alkali-slurry spray of hydrated lime in a spray dryer. The products formed are calcium sulfate and calcium nitrate, which are harmless granular solids. This method can be used for the simultaneous removal of $SO_2$, $NO_x$ and HCl from the flue gas of waste incinerators.

Although electron beam processing can be very effective, the high capital cost and x-ray hazard associated with its present implementation in power plant applications have discouraged researchers from using this technique in small scale applications, such as treatment of engine exhaust. Conventional accelerators employed in electron beam apparati use a "window" containing a thin metal foil (e.g., Ti—Pb). The foil window forms a barrier between the electron beam source, which is under high vacuum, and the atmosphere in the reaction chamber. It is sufficiently thin so as to be partially transparent to the electron beam. The high accelerating potential necessary to penetrate the foil window requires an expensively constructed electron beam gun having stringent insulation requirements. At the same time, such a high accelerating potential produces strong x-rays at the point of incidence, so that extensive radiation shielding is also required. Conventional windows have a high transmission loss, leading to high usage of electricity and high thermal loading.

Recently, compact low-energy electron accelerators have been developed to meet the requirements of industrial applications, utilizing for example, special materials that make the window thin and rugged, as disclosed for example in U.S. Pat. No. 6,002,202. However, successful application of compact low-energy electron beam accelerators in vehicle exhaust clean-up has not been achieved.

Accordingly, a need exists to improve NOx reduction efficiency using excitation techniques, particularly in exhaust gas streams from vehicle engines.

SUMMARY OF THE INVENTION

The invention includes a system, vehicle and process that employs one or more compact electron beam device(s) in the presence of relatively pure nitrogen gas to inject deactivated nitrogen atoms into a NOx-containing engine exhaust to efficiently reduce NOx. A relatively pure (greater than 99%) and essentially oxygen-free nitrogen gas source is preferably adapted for injection into the exhaust at relatively low exhaust temperatures, e.g., less than about 200 degrees C., and usually about 100 degrees C. or less.

Due to such low temperatures during NOx reduction, the invention allows at least a portion of the emissions control equipment of a vehicle to be located remotely from the engine. An advantage of the invention is that it provides highly efficient NOx reduction without the necessity of a catalyst. Furthermore, the non-catalytic process of the invention is effective, particularly for highly efficient NOx reduction (more than 90% NOx reduction) in exhausts of advanced engines that emit an initial NOx exhaust content of 150 ppm or less at temperatures of 200 degrees C. or less. It has been difficult for state-of-the-art catalyst systems to achieve high NOx reduction under these conditions of relatively low initial NOx and low exhaust temperature.

DETAILED DESCRIPTION OF THE INVENTION

Figure 1:
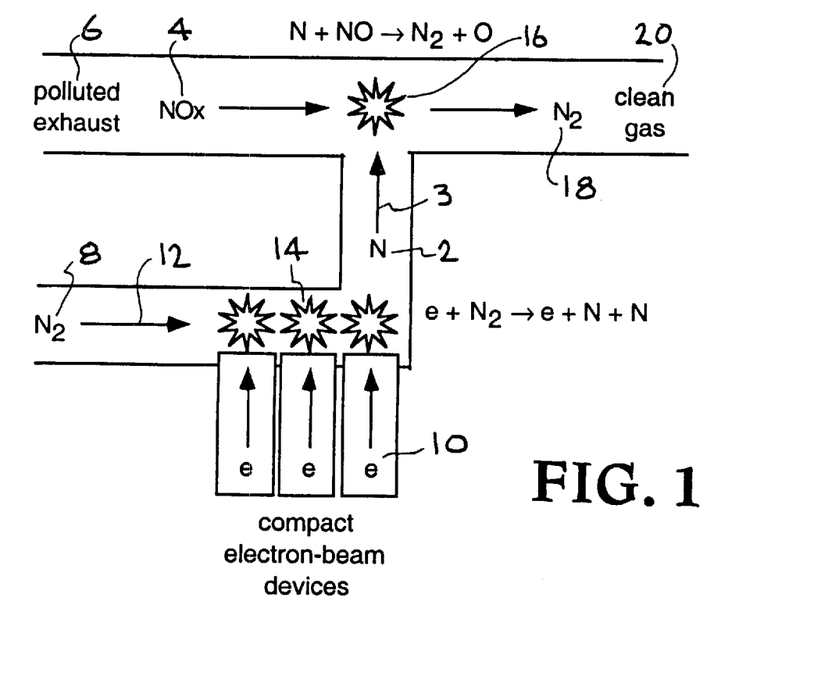
FIG. 1 shows a schematic of the process of the invention including generating deactivated nitrogen atoms and injecting such atoms into an engine exhaust.

Deactivated atomic nitrogen generated by an electron beam is injected at low temperatures into an engine exhaust to reduce NOx emissions. FIG. 1 shows a schematic of the process using deactivated nitrogen atoms 2 of separate atomic gas stream 3 for chemical reduction of NOx 4 in a NOx-containing exhaust stream 6, and such deactivated nitrogen atoms 2 are produced by electron-beam irradiation of molecular nitrogen, i.e., $N_2$ molecules 8, via compact electron beam devices 10 in a separate injection molecular gas stream 12 of essentially pure $N_2$, i.e., at least 99% by volume.

Further in FIG. 1, the "N-atom generation site" (14) is the region where high kinetic energy electrons are used to impact the $N_2$ molecular gas (8) to produce N atoms (2). The "NOx-reduction site" 16 is a region where the N-atoms are injected into the NOx-containing exhaust gas in order to chemically reduce NOx (4) to $N_2$ product molecules 18 of a relatively clean product exhaust gas 20.

Dissociation of $N_2$ molecules by high kinetic energy electrons can produce N atoms in essentially two types of electronic states. The ground electronic state is referred to as $N(^4S)$, or simply N, and is referred to as the "deactivated" nitrogen atom. The excited electronic states are referred to as $N(^2D)$ and $N(^2P)$, and are referred to as "activated" nitrogen atoms. The $N(^2D)$ and $N(^2P)$ forms of atomic nitrogen have also been referred to as "metastable" nitrogen atoms.

The dissociation of $N_2$ molecules by collisions with electrons produce various amounts of $N(^4S)$, $N(^2D)$ and $N(^2P)$ according to the following reactions:

$$e+N_2 \rightarrow N(^4S)+N(^4S)+e$$

$$e+N_2 \rightarrow N(^4S)+N(^2D)+e$$

$$e+N_2 \rightarrow N(^4S)+N(^2P)+e$$

$$e+N_2 \rightarrow N++N(^4S)+2e$$

$$e+N_2 \rightarrow N++N(^2D)+2e$$

The nitrogen atoms produced by an electron beam according to the above reactions can comprise, for example, 61 percent $N(^4S)$, 29 percent $N(^2D)$ and 10 percent $N(^2P)$, as described in C. Willis and A. W. Boyd, "Excitation in the Radiation Chemistry of Inorganic Gases," Radiat. Phys. Chem. 8, 71–111 (1976).

The nitrogen atoms, in all forms, can react with NO to chemically reduce NO to $N_2$:

$$N(^4S)+NO \rightarrow N_2+O$$

$$N(^2D)+NO \rightarrow N_2+O$$

$$N(^2P)+NO \rightarrow N_2+O$$

The $N(^2D)$ and $N(^2P)$ "activated" nitrogen atoms can also react with $O_2$ molecules in the exhaust gas and produce NO:

$$N(^2D)+O_2 \rightarrow NO+O$$

$$N(^2P)+O_2 \rightarrow NO+O$$

The reactions of $N(^2D)$ and $N(^2P)$ with $O_2$ to produce NO can occur at any temperature. The $N(^4S)$ ground-state nitrogen atoms can also react with $O_2$ molecules to produce NO, but this reaction happens only at a significant rate at temperatures greater than 200 degrees C. It is therefore desirable to "deactivate" the excited-state $N(^2D)$ and $N(^2P)$ atoms to the ground-state $N(^4S)$ atoms.

By producing $N(^2D)$ in a gas stream containing pure $N_2$ molecules, the deactivation of $N(^2D)$ to $N(^4S)$ can be accomplished by collision of $N(^2D)$ with $N_2$ molecules:

$$N(^2D)+N_2 \rightarrow N(^4S)+N_2$$

The rate constant for this reaction has been measured by several researchers and a critical evaluation of these measurements are reported in FIG. 15 of K. Schofield, "Critically Evaluated Rate Constants for Gaseous Reactions of Several Electronically Excited Species", J. Phys. Chem. Ref. Data 8, 723–763(1979). Using this rate constant it is possible to determine the time required to deactivate $N(^2D)$ to $N(^4S)$.

Figure 2:
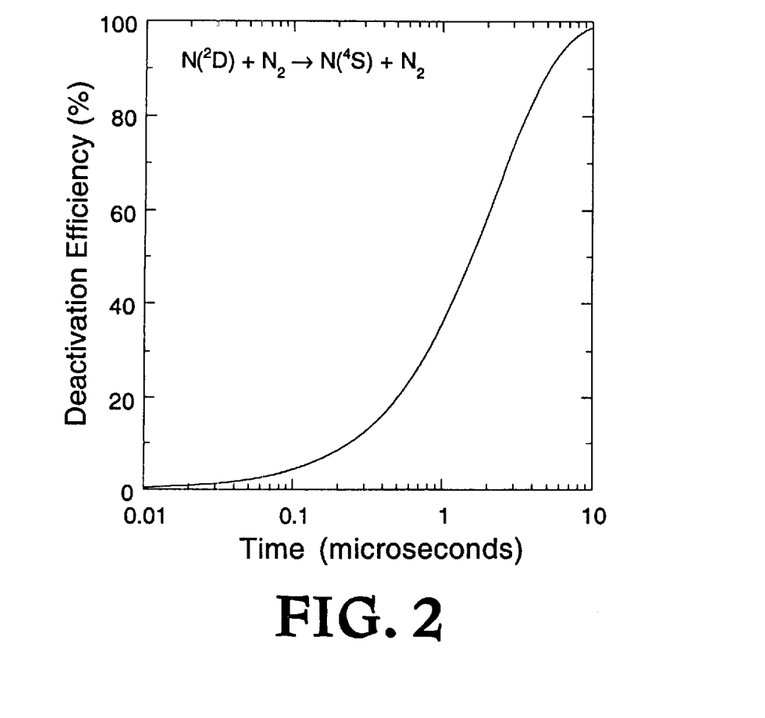
FIG. 2 illustrates the time requirement to deactivate nitrogen atoms from one form $N(^2D)$ of activated state.

FIG. 2 shows the time required to deactivate $N(^2D)$ to $N(^4S)$. It is illustrated in FIG. 2 that about 90 percent of the $N(^2D)$ is deactivated to $N(^2S)$ after only 5 microseconds. For times greater than 5 microseconds, nearly all of the $N(^2D)$ are deactivated down to $N(^4S)$. Accordingly, the method of the invention preferably includes deactivating $N(^2D)$ to $N(^4S)$ over a time interval between the N-atom generation site and the NOx-reduction site that is at least 5 microseconds.

The deactivation of $N(^2D)$ to $N(^4S)$ can be accomplished in a gas stream containing relatively high-purity $N_2$ molecules. Otherwise, if the gas in the N-atom generation site contains significant amounts of $O_2$ molecules or $H_2O$ molecules, the $N(^2D)$ preferentially reacts with the $O_2$ or $H_2O$ molecules (forming NO+0) instead of $N_2$.

Figure 3:
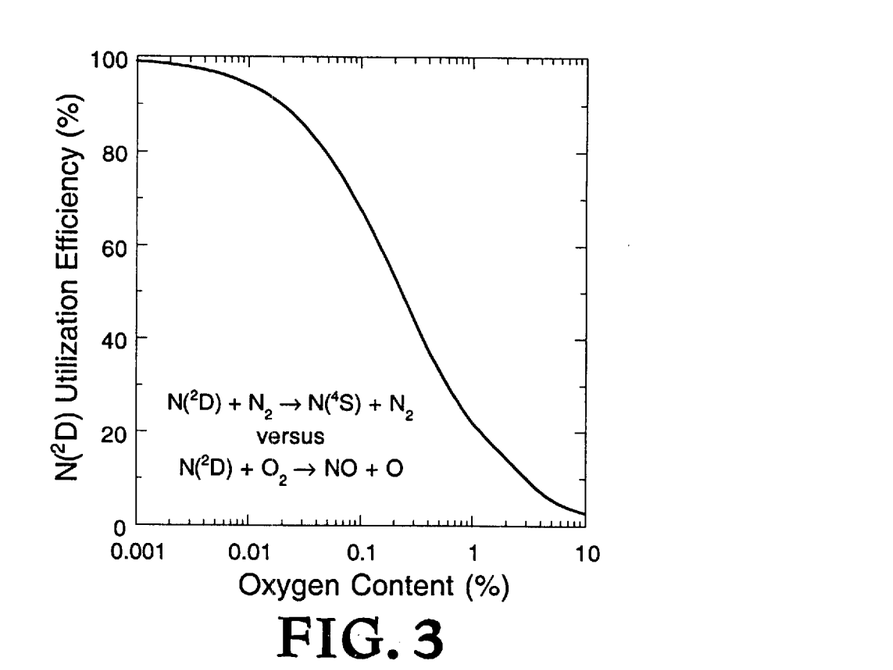
FIG. 3 illustrates the percentage of nitrogen $N(^2D)$ that is deactivated in a nitrogen/oxygen gas stream as a function of the oxygen content.

FIG. 3 shows the percentage of $N(^2D)$ that can be deactivated to $N(^4S)$ as a function of the oxygen content in the $N_2$ gas used in the N-atom generation site. FIG. 3 illustrates that an oxygen content of only 0.02 percent is sufficient to consume 10 percent of the available $N(^2D)$. Thus, in the method of the invention for using $N_2$ gas to deactivate N, the $N_2$ gas should have a purity of at least 99.98 volume percent. To deactivate $N(^2S)$ to $N(^4S)$, the purity of the $N_2$ gas in the separate injection molecular gas stream fed to the N-atom generation site (and N atoms fed to the NOx-reduction site) is preferably at least about 99.98 percent.

The deactivation of $N(^2P)$ to $N(^4S)$ can be also accomplished by collision of $N(^2P)$ with $N_2$ molecules:

$$N(^2P)+N_2 \rightarrow N(^4S)+N_2$$

The rate constant for this reaction has been measured by several researchers and a critical evaluation of these measurements have been reported in FIG. 16 of K. Schofield, "Critically Evaluated Rate Constants for Gaseous Reactions of Several Electronically Excited Species", J. Phys. Chem. Ref. Data 8, 723–763 (1979). Using this rate constant it is possible to determine the time required to deactivate $N(^2P)$ to $N(^4S)$.

Figure 4:
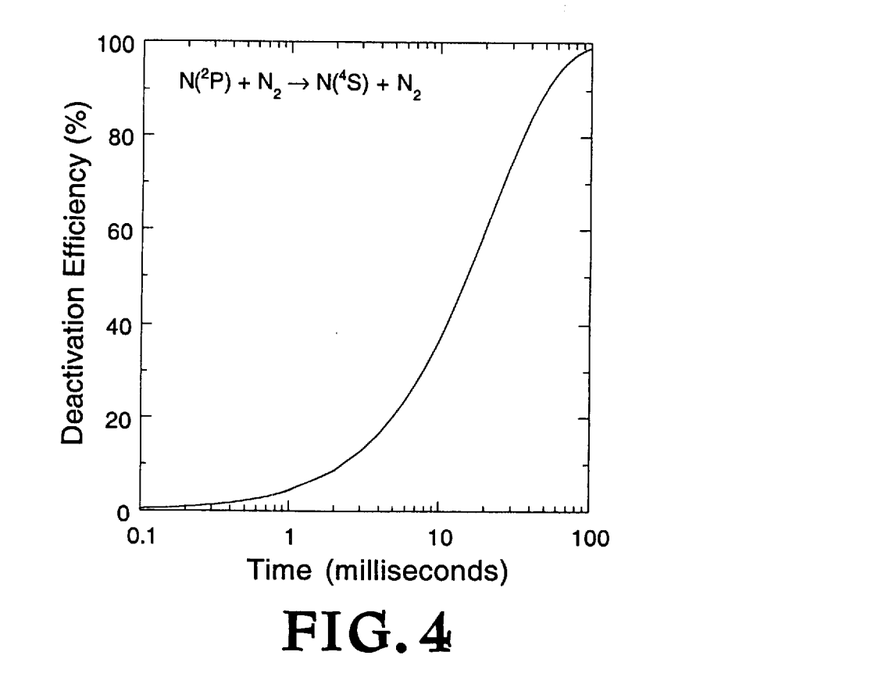
FIG. 4 illustrates the time requirement to deactivate nitrogen atoms from a second form $N(^2P)$ of activated state.

FIG. 4 shows the time required to deactivate $N(^2P)$ to $N(^4S)$.

It is noted from FIG. 4 that it takes at least 50 milliseconds to deactivate $N(^2P)$ to $N(^4S)$. Such time is much longer than the time required to deactivate $N(^2D)$ to $N(^4S)$. Such time is also close to the time for which a significant amount of the $N(^4S)$ can recombine to reform $N_2$:

$$N(^4S)+N(^4S)+N_2 \rightarrow 2N_2$$

Fortunately, the $N(^2P)$ species comprise only about 10 percent of the total number of nitrogen atoms. Thus, about 90 percent of the total number of nitrogen atoms produced by the electron beam at the N-atom generation site can be utilized for NOx reduction even without disposal of $N(^2P)$.

The compact electron beam device requires electrical power to operate. The electrons in an electron beam device are produced and energized in a vacuum or very low pressure gas before being injected into an atmospheric pressure gas.

Figure 5:
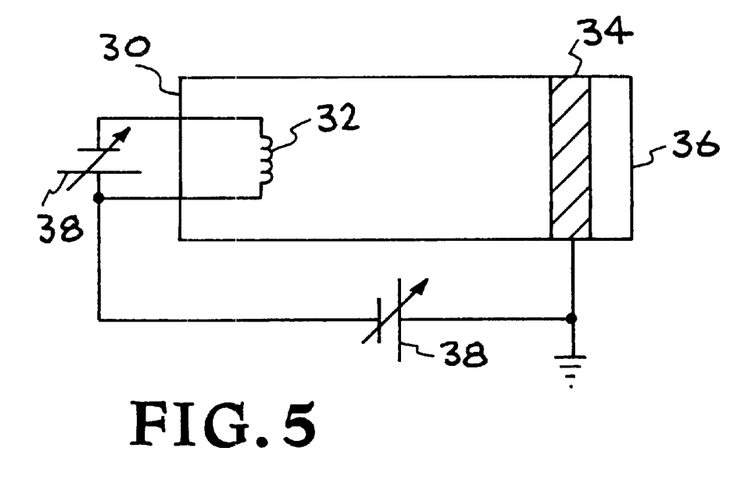
FIG. 5 shows a schematic of a compact electron beam source.

FIG. 5 illustrates a schematic of a compact electron beam source. The source works in a similar manner to a conventional electron gun, such as in a cathode ray (e.g. television) tube. A sealed vacuum enclosure, e.g. tube 30, houses a filament 32 and an accelerating electrode 34. When filament 32 is heated via adjustable power supplies 38, it releases electrons which are then accelerated to the other end of tube 30. Unlike the cathode ray tube, which has a phosphor screen at the opposite end of the tube, the end of the electron beam source contains a thin window 36 that forms the vacuum seal, but is reasonably transparent to electrons. The high-energy electrons going though thin window 36 can then be used to produce a large volume of plasma as they collide with the gas molecules (such as $N_2$) in an atmospheric-pressure processing chamber, such as an engine exhaust chamber, and even at relatively high flow rates. A compact electron beam device has dimensions which are typically in the range from about 3 to about 5 cm in diameter and about 8 to about 12 cm in length. An example of a compact electron beam device useful in the invention is described in "More Efficient, Less Expensive Electron Beam Processing," Science & Technology Review, Lawrence Livermore National Laboratory, November/December 1995 and also in R&D Magazine, September 1995, p. 51 and p. 55 the description of which is incorporated by reference herein its entirety.

The electron beam tube is a low cost alternative to large electron beam processing systems and does not require extensive x-ray shielding. A feature of the tube is a reliable thin membrane window capable of transmitting electron current densities of several milliamperes per square centimeter with greater than 85%, and normally at least 90% efficiency at about 50–75 kilovolts. An example of a rigid thin window than can be used for compact electron beam devices is disclosed in U.S. Pat. No. 6,002,202.

In contrast to the electron beam method, an electrical discharge method involves high voltage electrodes being immersed in the atmospheric-pressure gas, instead of the vacuum. This avoids the need for a vacuum window, which has been a major source of device failure in the electron beam method. However, in the discharge method most of the electrons never reach high energies because they collide with and transfer energy immediately to the gas molecules before they can be accelerated sufficiently.

Figure 6:
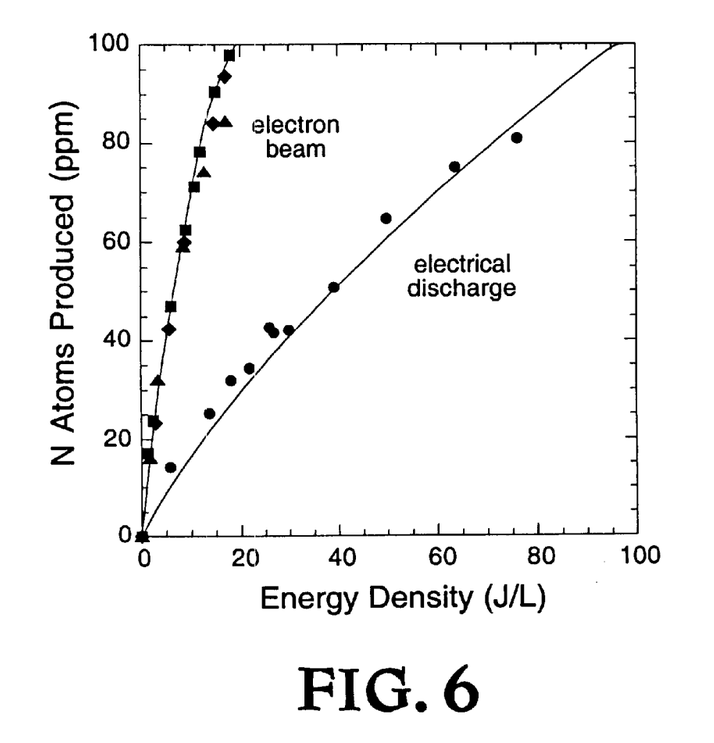
FIG. 6 shows a comparison between the efficiency of electron beam and electron discharge for atomic nitrogen production.

The amount of electrical power required in the process of the invention depends on the amount of NO molecules that need to be reduced to $N_2$ and the flow rate of the NO-containing exhaust stream. FIG. 6 shows the total number of nitrogen atoms produced by the electron beam in an atmospheric-pressure $N_2$ gas as a function of the electrical energy density delivered to the electron beam device (s)—the electrical energy density being given in units of joules per standard liter (J/L). The electrical energy density is the ratio of the electrical power input to the gas flow rate. FIG. 6 also compares the efficiency of the electron beam to electrical discharge. An electrical discharge is a pulsed corona, dielectric-barrier discharge, microwave discharge, plasma arc jet, or other types of high-voltage device in which the electrons are produced and energized within the atmospheric pressure gas. In contrast, the electrons in an electron beam device are produced and energized in a vacuum or very low pressure gas before being injected into the atmospheric pressure gas. Each of the compact electron beam devices discussed above typically can deliver up to about 150 watts.

In the experimental example illustrated in FIG. 6, the nitrogen atoms produced are measured by NO titration method. A dilute mixture of NO in pure $N_2$ is used. The number of NO molecules that is removed is equal to the number of nitrogen atoms that is produced. The electron beam produces 100 ppm (parts per million) of nitrogen atoms when the energy density is 16 J/L. The nitrogen atom production efficiency is therefore 6.25 ppm-L/J. When the skilled artisan is able to utilize only the $N(^4S)$ and $N(^2D)$ components of these nitrogen atoms, the N production efficiency is still 5.6 ppm-L/J. For example, when the NOx-containing exhaust stream, such as found in a light-duty diesel engine exhaust, has a gas flow rate of 2000 L/min (standard liters per minute) and contains 100 ppm of NOx (the amount of NOx that is typical of light-duty diesel engine exhaust), the NOx flow rate is therefore 200,000 ppm-L/min or 3,333 ppm-L/s. The electrical power required by the electron beam is equal to the NOx flow rate divided by the N-atom production efficiency, i.e., 3,333 ppm-L/s divided by 5.6 ppm-L/J=595 J/s or 595 W (watts). In contrast, a microwave reactor or any other type of electrical discharge device will require almost 3 kilowatts, a factor of at least 3, and usually at least 5 times higher consumption of electrical power than with the compact electron beam. The invention thus can provide a means (e.g., compact electron beam devices) for producing nitrogen atoms with a substantially smaller amount of electrical power than conventional means (e.g., microwave, rf, pulsed corona, dielectric-barrier discharge and other types of electrical discharge plasma reactors).

For a known NOx flow rate, the electrical power required by the electron beam can be predetermined. The highly pure $N_2$ gas flow rate at the N-atom generation site can be predetermined to be less than the exhaust gas flow rate in the NOx-reduction site, as long as the NOx flow rate of the engine exhaust and the N-atom flow rate of the separate injection gas stream are essentially the same. For example, when the exhaust gas stream has a gas flow rate of 2000 L/min and contains 100 ppm of NOx, the NOx flow rate is therefore 200,000 ppm-L/min. A predetermined $N_2$ gas flow rate of only 200 L/min. can produce an N-atom flow rate of 200,000 ppm-L/min provided the electron beam can produce 1000 ppm of N atoms. Accordingly, in the invention the gas flow rate in the N-atom generation site is preferably less than or equal to the gas flow rate in the NOx-reduction site, i.e., the NOx flow rate is equal to or less than the N-atom flow rate.

The N($^4$S) can recombine to reform N$_2$:

$$N(^4S)+N(^4S)+N_2 \rightarrow 2\ N_2$$

Figure 7:
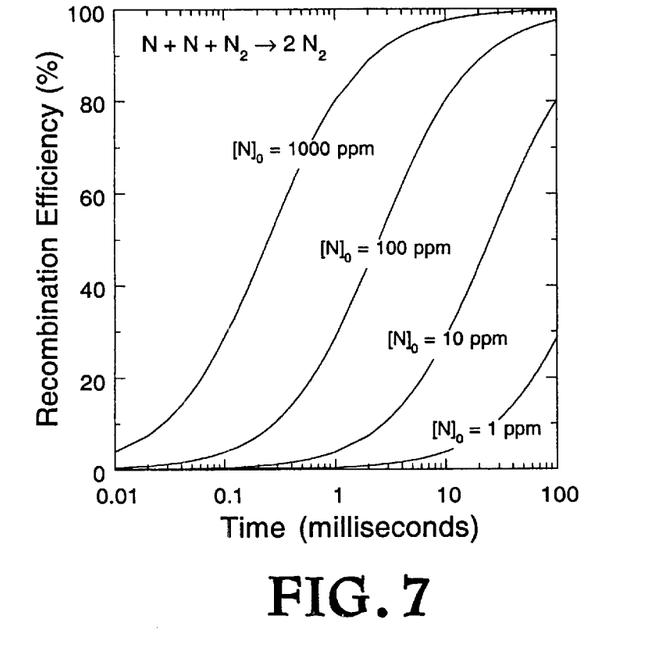
FIG. 7 shows the efficiency of recombination of deactivated atomic nitrogen to nitrogen molecules as a function of time and concentration.

The time for which a certain amount of N($^4$S) can recombine is proportional to the concentration of N($^4$S). High concentrations of N($^4$S) provide faster recombination times. FIG. 7 shows the efficiency at which N($^4$S) recombines to form N$_2$, as a function of time and N($^4$S) concentration. For a N($^4$S) concentration of 1 ppm, a time of 25 milliseconds causes 10 percent of the N($^4$S) atoms to recombine back to N$_2$. For a N($^4$S) concentration of 10 ppm, a time of 2.5 milliseconds can cause 10 percent of the N($^4$S) atoms to recombine back to N$_2$. For a N($^4$S) concentration of 100 ppm, a time of 0.25 milliseconds can cause 10 percent of the N($^4$S) atoms to recombine back to N$_2$. For a N($^4$S) concentration of 1000 ppm, a time of 0.025 milliseconds can cause 10 percent of the N($^4$S) atoms to recombine back to N$_2$. The time required to deactivate N($^2$D) to N($^4$S) is very short. Nearly all the N($^2$D) are deactivated to N($^4$S) after 10 microseconds. The time necessary for a significant amount of N($^4$S) to recombine back to N$_2$ is much longer. Thus, the time required between the N-atom generation site and the NOx-reduction site is determined primarily by the requirement that no more than a given amount of N($^4$S) recombines. Thus, in a method for injecting N($^4$S) to reduce NOx, the time between the N($^4$S) generation site and the NOx-reduction site is less than 25 milliseconds for a N($^4$S) concentration of less than about 1 ppm, preferably less than 2.5 milliseconds for a N($^4$S) concentration of less than about 10 ppm, preferably less than 0.25 milliseconds for a N($^4$S) concentration of less than about 100 ppm, and most preferably less than 0.025 milliseconds for a N($^4$S) concentration of less than about 1000 ppm.

The N($^4$S) atoms can react with O$_2$ to form NO if the temperature of the NOx-containing and O$_2$-containing exhaust stream is sufficiently high:

$$N(^4S)+O_2 \rightarrow NO+O$$

Figure 8:
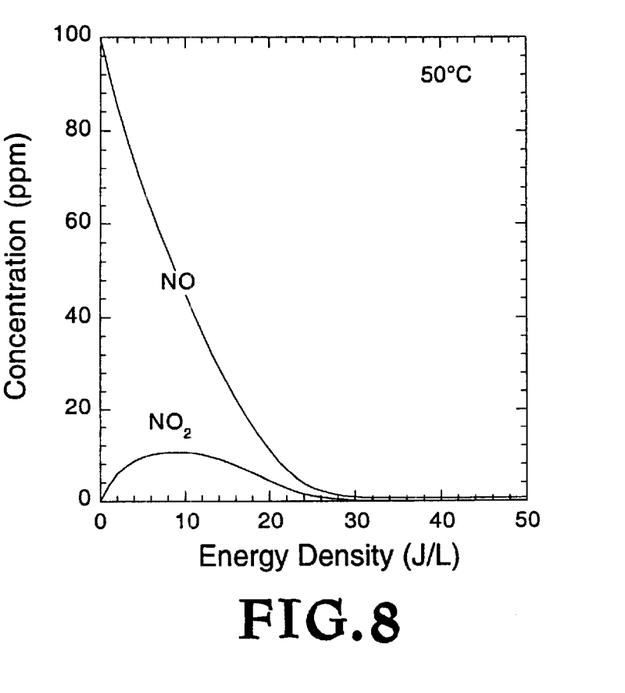
FIG. 8 illustrates NO and $NO_2$ concentrations in an engine exhaust gas stream when deactivated atomic nitrogen is injected into the stream at 50 degrees C.

It is a feature of the invention that the mixing of the N($^4$S) atoms with NOx molecules is done at a relatively low temperature. For example, FIG. 8 shows concentrations of NO and NO$_2$ during N($^4$S) atom injection into a gas mixture containing 100 ppm NO, 10% O$_2$ balance N$_2$, at a gas temperature of 50 C. At a temperature of 50 C, nearly all of the N($^4$S) atoms are utilized in the chemical reduction of NOx to N$_2$. All of the NOx (NO+NO$_2$) are reduced when a sufficient amount of N($^4$S) atoms is injected at the low gas temperature. One hundred (100) percent NOx reduction efficiency can be obtained provided the gas temperature at the NOx-reduction site is maintained low, i.e., less than about 200 degrees C., preferably less than 150 degrees C., and most preferably less than 100 degrees C.

Figure 9:
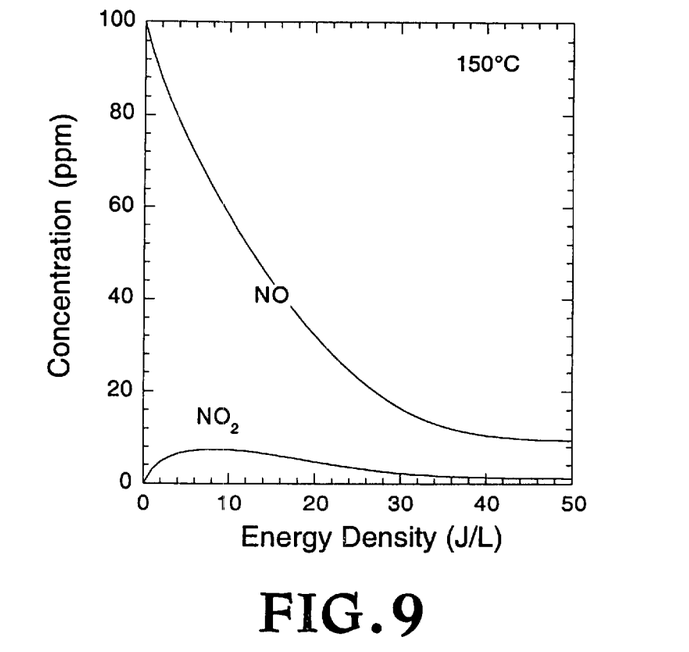
FIG. 9 illustrates NO and $NO_2$ concentrations in an engine exhaust gas stream when deactivated atomic nitrogen is injected into the stream at 150 degrees C.

In contrast to the data in FIG. 8, FIG. 9 shows concentrations of NO and NO$_2$ during N($^4$S) atom injection into a gas mixture containing 100 ppm NO, 10% O$_2$, balance N$_2$, at a gas temperature of 150 C. At a temperature of 150 C, a significant amount of the N($^4$S) atoms is consumed in the production of NO. It is no longer possible to obtain 100 percent NOx reduction.

Figure 10:
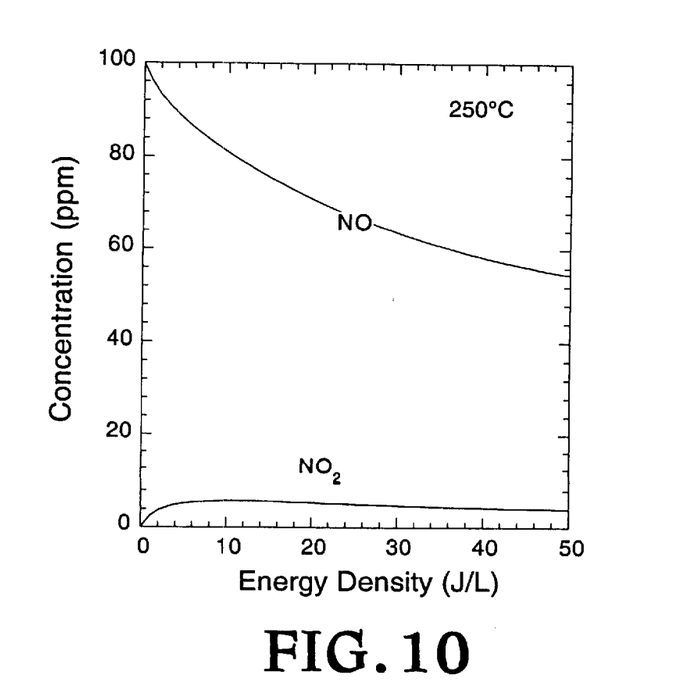
FIG. 10 illustrates NO and $NO_2$ concentrations in an engine exhaust gas stream when deactivated atomic nitrogen is injected into the stream at 250 degrees C.

In a further comparison, FIG. 10 shows concentrations of NO and NO$_2$ during N($^4$S) atom injection into a gas mixture containing 100 ppm NO, 10% O$_2$, balance N$_2$, at a gas temperature of 250 C. At a temperature of 250 C, a large number of the N($^4$S) atoms is consumed in the production of NO. The maximum NOx reduction that can be achieved at such a high gas temperature is only about 50 percent. In the inventive method for injecting N($^4$S) to reduce NOx, the gas temperature at the NOx-reduction site is preferably less than 200 C, and more preferably less than 150 C.

The invention includes a vehicle such as a truck or automobile having an engine exhaust emission control system in which the system encompasses one or more a compact electron beam devices as has been described hereinbefore and illustrated in FIG. 5.

The vehicle preferably employs a diesel engine adapted to generate a NOx containing exhaust gas stream, such as stream 6 in FIG. 1. The system includes means for injecting a second gas stream comprising a gas other than the NOx-containing exhaust gas stream, more particularly a gas stream containing the relatively pure nitrogen molecular composition such as stream 8 of FIG. 1, into said NOx-containing exhaust gas stream.

The compact electron beam devices are positioned in the vehicle so as to be adapted to irradiate the second gas stream (e.g., a gas stream containing greater than 99% nitrogen molecules) prior to the second gas stream being injected into the NOx-containing exhaust gas stream. Since the time interval after irradiation of the second gas stream is relatively small, normally the irradiated second gas stream continues to pass into the exhaust stream through its original conduit employed prior to irradiation. Any means well known in the art for passing gases from one location to another in a vehicle may be utilized. Furthermore, any conventional means for regulating the flow rate of the second gas stream to allow it to flow at a rate less than or equal to that of the NOx molecules contained in the NOx-containing exhaust gas stream can be employed.

Changes and modifications in the specifically described embodiments can be carried out without departing from the scope of the invention which is intended to be limited only by the scope of the claims.

I claim:

1. A process for reducing NOx from a gas stream comprising NOx, said process comprising:
   generating deactivated nitrogen atoms from electron beam radiation of a second gas stream comprising at least 99.98% of nitrogen molecules; and
   injecting said deactivated nitrogen atoms into said gas stream at a temperature less than 150 degrees C. to convert said NOx to nitrogen and oxygen.

2. The process of claim 1 wherein said injecting is conducted at a temperature less than 125 degrees C.

3. The process of claim 1 wherein a source of said electron beam radiation comprises one or more compact electron beam devices.

4. The process of claim 1 wherein said engine exhaust contains more than 1% oxygen.

5. The process of claim 1 wherein said gas stream comprises an engine exhaust generated from a diesel engine.

6. The process of claim 5 wherein said engine exhaust is emitted from a truck and comprises about 100 to about 500 ppm of NOx.

7. The process of claim 5 wherein said engine exhaust is emitted from an automobile and comprises about 25 to about 250 ppm of NOx.

8. A process for reducing NOx from a vehicle engine exhaust comprising NOx, said process comprising:
   generating deactivated nitrogen atoms from a gas stream comprising at least about 99.98% of nitrogen molecules by irradiating said nitrogen molecules with one or more compact electron beam source devices; and injecting said deactivated nitrogen atoms into said engine exhaust to convert said NOx to nitrogen and, oxygen.

9. The process of claim 8 wherein said injecting is conducted at a temperature less than about 150 degrees C.

10. The process of claim 9 wherein said vehicle engine exhaust is generated from an automobile and comprises less than 250 ppm of NOx.

11. The process of claim 9 wherein said vehicle engine exhaust is generated from a truck and comprises less than 500 ppm of NOx.

12. The process of claim 8 wherein said deactivated nitrogen atoms are generated from said nitrogen molecules in said gas stream in greater than about 5 microseconds.

13. A vehicle comprising an engine exhaust emission control system, said system comprising one or more a compact electron beam devices adapted to irradiate a gas stream comprising at least about 99.98% of nitrogen molecules prior to said gas stream contacting a NOx-containing exhaust gas stream from an engine of said vehicle.

14. The vehicle of claim 13 comprising a diesel engine adapted to generate said NOx-containing exhaust gas stream.

15. The vehicle of claim 14 wherein said system further comprising means for injecting irradiated nitrogen molecules from said gas stream into said NOx-containing exhaust gas stream.

16. The vehicle of claim 15 further comprising means for regulating the flow rate of said gas stream to less than or equal to that of NOx in said NOx-containing exhaust gas stream.

* * * * *